United States Patent
Topol et al.

(10) Patent No.: US 6,792,291 B1
(45) Date of Patent: Sep. 14, 2004

(54) INTERFACE DEVICE FOR CONTROL OF A CELLULAR PHONE THROUGH VOICE COMMANDS

(76) Inventors: Chaim Topol, 3 Doy Hoz Street, Tel Aviv 63564 (IL); Amir Geva, 25 Shibolet Street, Shoham 73142 (IL)

( * ) Notice: Subject to any disclaimer, the term of this patent is extended or adjusted under 35 U.S.C. 154(b) by 252 days.

(21) Appl. No.: 09/669,026

(22) Filed: Sep. 25, 2000

(51) Int. Cl.[7] .............................................. H04B 1/38
(52) U.S. Cl. ..................... 455/564; 455/556.1; 455/563
(58) Field of Search .............................. 455/563, 550.1, 455/569.1, 90.2, 90.3, 564, 556.1; 379/433.01

(56) References Cited

U.S. PATENT DOCUMENTS

| | | | | |
|---|---|---|---|---|
| 4,599,615 A | * | 7/1986 | Umetsu ...................... 340/7.4 |
| 5,557,653 A | * | 9/1996 | Paterson et al. ............ 455/568 |
| 5,613,222 A | | 3/1997 | Guenther ..................... 455/89 |
| 6,021,207 A | | 2/2000 | Puthuff et al. .............. 381/330 |
| 6,035,217 A | | 3/2000 | Kravitz ....................... 455/561 |
| 6,078,825 A | | 6/2000 | Hahn et al. .................. 455/569 |
| 6,128,514 A | * | 10/2000 | Griffith et al. .............. 455/564 |
| 6,240,303 B1 | * | 5/2001 | Katzur ........................ 455/563 |
| 6,377,820 B1 | * | 4/2002 | Courtis et al. .............. 455/563 |
| 6,459,911 B1 | * | 10/2002 | Hijii ............................ 455/563 |

* cited by examiner

*Primary Examiner*—Quochien B. Vuong
(74) *Attorney, Agent, or Firm*—Fitch, Even, Tabin & Flannery

(57) ABSTRACT

A compact interface device for use with a communication apparatus, e.g. a cellular phone is described. The interface device enables a user to make a telephone call through a voice command to any other communication apparatus. The interface device includes an adapter having a controller circuit triggered by a switch, in order to (i) dial a predetermined number associated with a remote service provider, and (ii) terminate the connection; a speaker for reproducing incoming signals of the phone call; and a microphone for receiving audio signals generated by the user. According to another aspect of the invention, there is provided a method of making a telephone call through a voice command by using the interface device.

25 Claims, 2 Drawing Sheets

INTERFACE DEVICE FOR CONTROL OF A CELLULAR PHONE THROUGH VOICE COMMANDS

FIELD OF THE INVENTION

This invention relates to the field of wireless communication, and, more particularly, to hands-free communication utilizing a mobile phone.

BACKGROUND OF THE INVENTION

Using a conventional telephone inherently entails several operations, such as dialing a required number and holding a handset during conversation.

Placing a call via dialing a number may present a difficult task for small children who do not yet recognize numbers on the dialing keypad. Many aged and physically disabled people suffering from eye diseases also may not be able to dial a number by sight. Holding a handset close to the user's ear can be either tiring during long phone conversation or awkward and even dangerous, for example, in the case of using a cellular phone while driving a car. Holding a handset while driving may adversely affect the ability of the user to safety operate the car.

Various techniques are known in the art, which partially may solve these problems. For example, the problem of dialing a number has been addressed in U.S. Pat. No. 6,035,217 to Kravitz that describes a cellular phone having a possibility to place a telephone call by pressing only one single button on the phone. The single button, when pressed by a user, dials the number of the service provider stored in a memory of the phone. Then, the service provider connects the one button cellular phone to a desired number communicated by the user. The service provider in the Kravitz's patent can be either an automatic voice recognition device or a live operator.

While such one button cellular phone may solve the dialing problem, it does not handle the problem of holding a handset during the conversation. In addition, this phone has also another drawback that is pertinent to most of the conventional cellular phones and wireless communication devices. This drawback is associated with a potential danger to the user from electromagnetic microwave radiation related to transmission of signals from such apparatus. Thus, when using a hand-held cellular telephone, the user holds the phone close to his head, so the antenna, which usually extends from the top surface of the telephone, is in close proximity with the biological tissue of the user's hand and head as it transmits electromagnetic radiation. It is believed in certain communities that the radiation absorbed by the head and hand may cause cancer or create other health risks or hazards to the user talking over such apparatus. In addition, the energy absorbed by the head and hand reduces the strength of the radiation signal emitted from the antenna for communication and decreases the usable life of the battery of the cellular telephone.

The problem of holding a handset during conversation has been addressed, for example, in U.S. Pat. No. 5,613,222 to Guenther that provides a headset for hand-free communication over cellular phone. The headset of the Guenther's patent includes an acoustical earpiece, and a microphone mounted on the user's head. The earpiece and microphone are coupled to the cellular phone via a wire and a flexible acoustical tube that limit the mobility of the user. This patent also does not solve the aforementioned dialing problem.

U.S. Pat. No. 6,078,825 to Hahn, et al. describes wireless headset systems allowing to talk over a phone while leaving the user's hands free to perform some other tasks. The system includes a wireless headset with a boom microphone, which communicates with a base station to dial and send or receive calls via a cellular phone.

Another system for hand-free communication over cellular phone is described in U.S. Pat. No. 6,021,207 to Puthuff et al. Instead of a highly visible and cumbersome headset, the Puthuff's patent describes a compact earpiece assembly that can wirelessly communicate with an external device such as a personal communication node (that is a functional analog to of the Hahn's patent base station) or a cellular phone. Such earpiece is more cosmetically attractive, lightweight and comfortable to wear then the headset of the Hahn's patent. A voice recognition circuit may be included in the personal communication node for recognizing voice commands of the user for directing the cellular phone to perform certain functions, for example, to dial a phone number. After matching the voice command to a particular control function stored in the memory of the personal communication node, the voice recognition circuit can issue an appropriate code to control one or more remote devices.

While the dialing problem, in principle, may be solved by utilizing the techniques described in the Puthuff's patent, a main deficiency of this system is a limited number of commands that a cellular phone controlled by the voice recognition circuit may perform. Since these commands are stored in a memory chip of the personal communication node then the number of such commands is limited by volume of this chip. For example, if such command is an instruction to make a telephone call to a certain number pre-stored on the memory chip, then the amount of the pre-stored telephone numbers or names is limited by the volume of the chip's memory.

SUMMARY OF THE INVENTION

The above and other deficiencies of the prior art phone and headset systems are overcome by the present invention that provides a compact interface device for use with a communication apparatus, e. g. a cellular phone, that enables a user to make a telephone call through a voice command to any other communication apparatus. Such communication apparatus of the receiving party may be, for example, any other telephone, a cellular phone, a PC, a PDA, etc.

The interface device of the present invention has many of the advantages of the techniques mentioned heretofore, while simultaneously overcoming some of the disadvantages normally associated therewith.

The interface device to a cellular phone according to the present invention may be easily and efficiently manufactured and marketed.

The interface device to a cellular phone according to the present invention is of a durable and reliable construction.

The interface device to a cellular phone according to the present invention may have low manufacturing cost.

According to one broad aspect of the present invention, there is provided an interface device for use with a communication apparatus coupled to a communication system for enabling a user to make a telephone call through a voice command to a selected party from among a plurality of receiving parties that are coupled to said communication system, said interface device comprising:

(a) an adapter comprising a controller circuit triggered by at least one switch in order to send commands to communication apparatus for at least (i) dialing a predetermined number associated with a remote service provider for establishing a connection between the communication apparatus and the provider; said remote service provider is capable of establishing a telephone connection to said selected party from among said plurality of receiving parties in response to said user voice command, and (ii) terminating the connection;

(b) at least one switch being electrically coupled to the adapter;

(c) a speaker electrically coupled to the adapter for reproducing incoming signals of the phone call; and (d) a microphone electrically coupled to the adapter for receiving audio signals generated by the user.

According to another broad aspect of the invention, there is provided a method of making a telephone call through a voice command by using an interface device for a communication apparatus that is coupled to a communication system, the telephone call being to a selected party from among a plurality of receiving parties that are coupled to said communication system, the method comprising the steps of:

(a) triggering a sending of a command to a communication apparatus for dialing a predetermined number associated with a remote service provider for establishing a connection between the communication apparatus and the provider, said triggering is accomplished by means of at least one switch that is fitted to the interface device;

(b) said remote service provider establishing a telephone connection to the selected party from among said plurality of receiving parties in response to said user voice command; and (c) triggering a sending of a command to a communication apparatus for terminating the connection, said triggering is accomplished by means of at least one switch that is fitted to the interface device.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
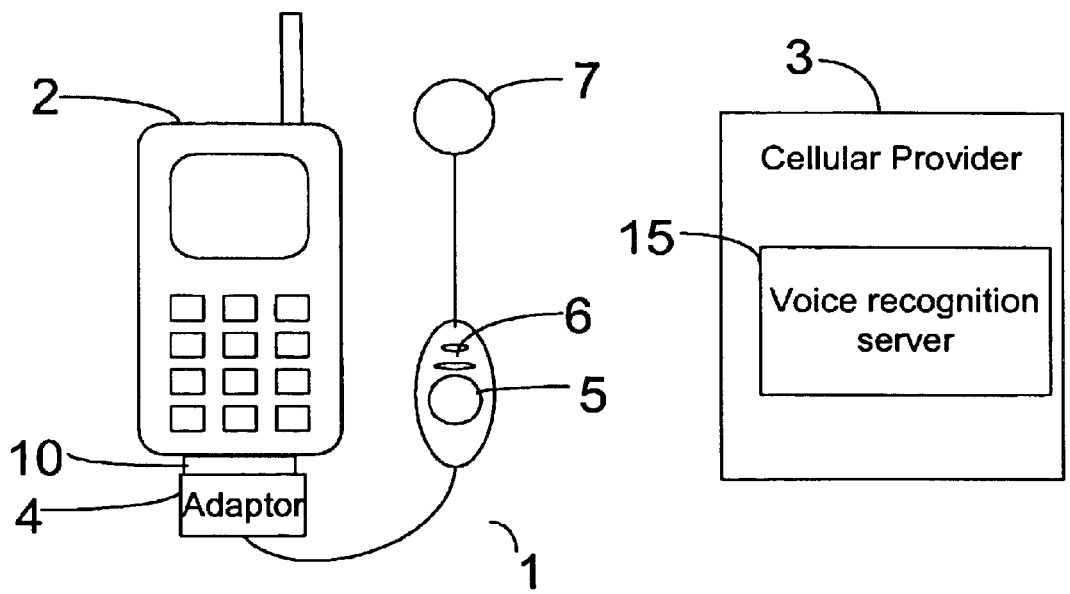
FIG. 1 illustrates an exemplary configuration of an interface device coupled to a cellular phone according to the present invention.

Referring to the drawings, FIG. 1 shows an exemplary configuration according to the present invention of an interface device 1 connected to a communication apparatus, such as a portable cellular phone 2 wirelessly coupled to a cellular communication system via a provider 3 of the communication system. In the preferred embodiment, the provider 3 of the cellular communication system includes a voice recognition server 15 for recognizing voice commands of the user for dialing a desired phone number.

The interface device 1 includes an adapter 4, a switch 5, a microphone 6 and a speaker 7. The switch 5 replaces the standard button keypad of the portable cellular phone 2.

In a preferred embodiment, the interface device 1 is modular in construction so that various elements, e.g. the adapter 4, the microphone 6, speaker 7, could be detached from each other. This allows elements of different capabilities to be readily substituted. Also preferably, that the switch 5 would have a button that is mounted together with the microphone 6 in one housing. This feature will allow physically disabled people to place hands-free calls only by holding the housing with the button and microphone in their mouth and initiating a telephone call by squeezing the button by the teeth. Yet preferably, that the speaker is mounted within an earpiece that is configured to fit over or in The user's ear. Although only one earpiece is shown in FIG. 1, it should be clear to a man of the art, that if it is desirable for the user, then the interface device 1 may be configured with two speakers mounted within two earpieces.

Figure 2:
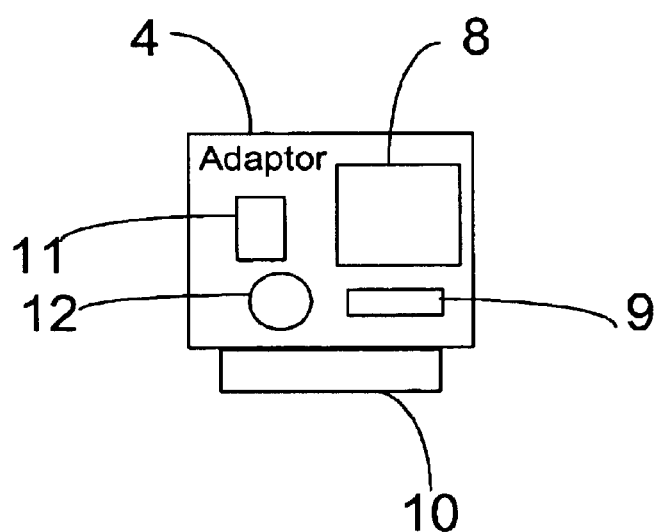
FIG. 2 illustrates an exemplary configuration of an adapter according to the present invention.

FIG. 2 shows the adapter 4 according to one embodiment of the invention that includes a controller circuit 8 for running software maintaining the telephone calls, a 2-wire-to-1-wire interface 9 for the controller circuit 8, and a connector 10 for electrical connection the interface device 1 to the cellular phone 2. The controller circuit 8 is electrically coupled to a crystal that may be an external crystal 11 or a crystal (not shown) that is a part of the controller circuit 8.

In one embodiment, an electrical battery 12 is included in the adapter 4 for supplying power to the electrical elements of the interface device 1. In another embodiment, the interface device 1 may utilize an external power source, for example, a battery (not shown) of the cellular phone 2 electrically coupled to the interface device 1 via the connector 10.

Figure 3:
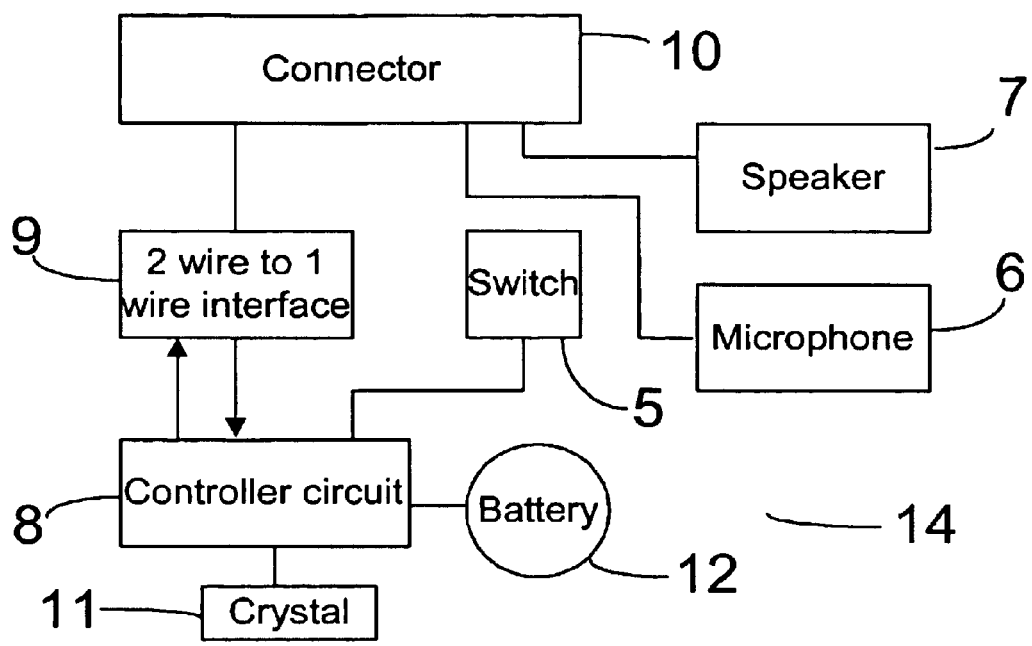
FIG. 3 shows a block diagram of the circuitry of an interface device according to the present invention.

FIG. 3 shows a block diagram of an electronic circuitry 14 of the interface device 1 according to the preferred embodiment of the invention. The electronic circuitry includes the connector 10 electrically connecting the cellular phone (not shown in FIG. 3) to the microphone 6, speaker 7, and to the controller circuit 8 via the 2-wire-to-1-wire interface 9. The 2-wire-to-1-wire interface 9 has a known per se open drain architecture and includes a transmitter circuit (TX) and a receiver circuit (RX) (not shown). The TX and RX circuits are designed for transmission and receipt signals of the controller circuit 8 for communication through the connector 10 with the cellular phone 2.

The controller circuit 8 is electrically connected to the crystal 11 that oscillates and thereby provides accurate pulses to the controller circuit 8 for asynchronous communication of the controller circuit with the cellular phone 2. The function of the crystal 11 is known in the art per se and will not be further expounded hereinafter.

The controller circuit 8 is also connected to the switch 5 and to a power source, such as the battery 12.

According to preferred embodiment of the present invention, controller circuit 8 is built on a conventional microcontroller chip with UART built-in that is able to exchange data with cellular phones, modems and other serial devices. For example, such microcontroller may be a conventional microcontroller 8051 or a microcontroller conventionally available from Microchip Technology Incorporated.

Figure 4:
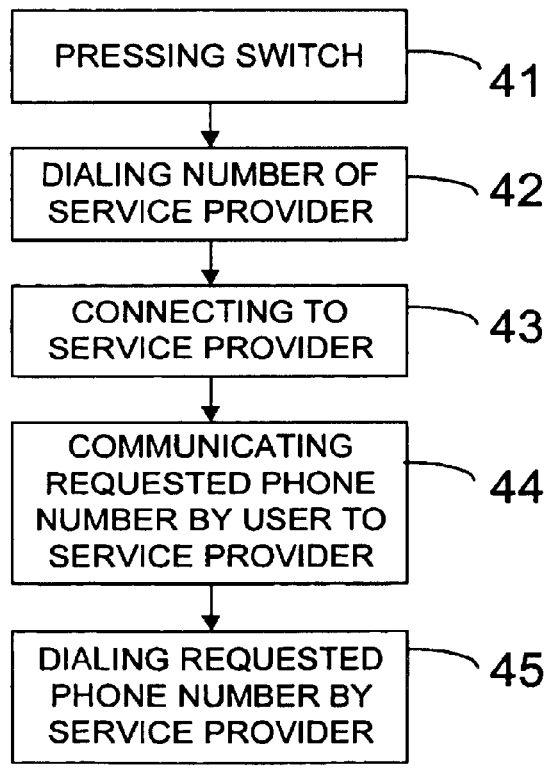
FIG. 4 illustrates a flow chart diagram of the steps involved in making a phone call by using the interface device in accordance with the present invention.

By this embodiment, in order to save power of the battery, as long as the interface device 1 is not in operation, it is in a power down state. Pressing the switch, "wakes up" the interface device 1 to its normal operation mode. FIG. 4 illustrates a flowchart of the steps involved in placing a call by using the interface device of the present invention. In operation, the user presses the button of the switch 5 (step 41) that triggers the control circuit 8 for running software electrically stored into a memory (not shown) of the control circuit 8. The control circuit 8 sends serial commands to the cellular phone 2 to put the phone in the dial mode and dial a predetermined number associated with the service provider 3 for connecting the cellular phone to the service provider 3 (step 42). After the call to the provider is answered, the user is connected to the provider 3 (step 43). Thereafter, the user communicates a desired phone number to the voice recognition server 15 by speaking the number to be called into the microphone 5 (step 44). The voice recognition sever 15 of the service provider 3 recognizers the number and dials the requested number (step 45).

The voice recognition technique utilized in the server 15 is known in the art per se, and will not be further expounded hereinafter.

After a call has been established the system is in a communication mode that way be terminated upon another press on the button of the switch 5. When the user wants to terminate the phone call, he/she presses the button of the switch 5 again. After the second press on the switch 5, the controller circuit 8 sends a serial release call command to the phone 2, and returns to the power down mode.

As such, those skilled in the art to which the present invention pertains can appreciate that while the present invention has been described in terms of preferred embodiments, the conception, upon which this disclosure is based, may readily be utilized as a basis for the designing of other structures, methods and systems for carrying out the several purposes of the present invention.

For example, for recognition of the voice commands of the user the invention is not limited only by utilizing the voice recognition server 12 that is a part of the provider 3. In another embodiment, the voice recognition server may be included either in the interface device 1 or in the cellular phone 2.

Although only the adapter with one switch was described above, it should be clear to a man of the art that, if it is desirable for the user, then the interface device may be configured with two switches. For example, one switch may be utilized for initiating a call and another switch may be utilized for terminating the call.

Also, it is to be understood that the phraseology and terminology employed herein are for the purpose of description and should not be regarded as limiting. It is important, therefore, that the scope of the invention is not to be construed as limited by the illustrative embodiments set forth herein, but is to be determined in accordance with the appended claims.

What is claimed is:

1. A hands free interface device for use to control a telephone apparatus to complete telephone connections through a telephone network using a voice responsive service provider having a predetermined telephone network access code, the interface device comprising:
   a connector for providing a removable connection between the interface and the telephone apparatus;
   a memory storing the predetermined access code of the voice responsive service provider;
   a user actuatable switch;
   a controller circuit responsive to user actuation of the switch for transmitting the predetermined access code from the memory to the telephone apparatus and causing the telephone apparatus to dial the predetermined access code to a telephone network;
   a speaker for converting signals from the telephone network into audible signals; and
   a microphone for conveying representations of a user's spoken voice via the telephone apparatus and the telephone network to the voice responsive service provider to establish a telephone network connection to a called party and to communicate with the called party upon establishment of the connection.

2. The interface device of claim 1 wherein said telephone apparatus is a cellular phone.

3. The interface device of claim 1 wherein the speaker is mounted in an earpiece and positioned to reproduce signals received from the telephone apparatus into an ear of the user.

4. The interface device of claim 1 wherein said telephone network comprises a wireless communication system.

5. The interface device of claim 1 wherein said controller circuit comprises a chip with UART built-in.

6. The interface device of claim 1 wherein said controller circuit is capable to send serial commands to the telephone apparatus to put the telephone apparatus in a dialing mode to dial the predetermined number.

7. The interface device of claim 1 wherein said controller circuit is capable to send serial commands to the telephone apparatus to terminate the connection with the telephone network.

8. The interface device of claim 1 wherein said controller circuit further includes a crystal capable of providing accurate pulses to the controller circuit.

9. The interface device of claim 1 further including a battery.

10. The interface device of claim 1 wherein said interface device utilizes an external power source.

11. The interface device of claim 1 wherein the voice responsive service provider includes a voice recognition server for recognizing voice commands of the user for dialing a requested phone number.

12. The interface device of claim 1 wherein the voice responsive service provider responds to a spoken telephone number of a certain party from a plurality of receiving parties.

13. The interface device of claim 1 wherein the voice responsive service provider responds to a spoken name of a certain party from a plurality of receiving parties.

14. The interface device of claim 1 wherein the called party is a member selected from the group that includes telephone, cellular phone, PC and PDA.

15. The interface device of claim 1 wherein the controller circuit responds to user interaction with the switch by terminating the connection.

16. The interface device of claim 1 including a terminating switch wherein terminating the telephone connection is accomplished by interaction with the terminating switch.

17. A method of making a telephone call through a voice command by using an interface device for a telephone apparatus that is coupled to a telephone network, the telephone call being to a selected party from among a plurality of receiving parties that are coupled to said telephone network, the method comprising the steps of:
   providing an interface device which is removably connectable to a telephone apparatus and stores a predetermined telephone number of a voice responsive service provider;
   triggering a sending of a command from the interface device to a telephone apparatus for dialing the predetermined number stored by the interface device for establishing a connection between the telephone apparatus and the voice responsive service provider, said triggering being accomplished by means of at least one switch that is fitted to the interface device;
   sending a user voice command initiated by a user from the interface device to the voice responsive service provider;

said voice responsive service provider establishing a telephone connection to the selected party from among said plurality of receiving parties in response to said user voice command; and triggering a sending of a command to the telephone apparatus for terminating the connection, said triggering is accomplished by means of at least one switch that is fitted to the interface device.

18. The method of claim 17 wherein said telephone apparatus is a cellular phone.

19. The method of claim 17 wherein the telephone network comprises a wireless communication system.

20. The method of claim 17 wherein a controller circuit of said interface device comprises a chip with UART built-in.

21. The method of claim 17 wherein the voice response remote service provider includes a voice recognition server for recognizing voice commands of the user for dialing a requested phone number.

22. The method of claim 17 wherein the selected party is a member selected from a group that includes telephone, cellular phone, PC and PDA.

23. The method of claim 17 wherein step of triggering dialing and the step of triggering termination are accomplished by switching the same switch of the interface device.

24. The method of claim 17 wherein the interface device includes two switches, and the step of triggering dialing is accomplished by switching one switch and the step of triggering termination is accomplished by switching another switch.

25. The method of claim 17 wherein said interface device comprises:

(a) an adapter comprising a controller circuit triggered by said at least one switch;

(b) said at least one switch being electrically coupled to the adapter;

(c) a speaker electrically coupled to the adapter for reproducing incoming signals of the phone call; and (d) a microphone electrically coupled to the adapter for receiving audio signals generated by the user.

* * * * *